United States Patent [19]

Ash et al.

[11] Patent Number: 5,077,065
[45] Date of Patent: Dec. 31, 1991

[54] METHOD FOR EXTENDING THE HOLDING TIME FOR COOKED FOOD

[75] Inventors: Dennis G. Ash; V. N. Mohan Rao; Sylvia L. Schonauer, all of Louisville, Ky.

[73] Assignee: KFC Corporation, Louisville, Ky.

[21] Appl. No.: 613,203

[22] Filed: Nov. 14, 1990

[51] Int. Cl.$^5$ ............................................. A23L 1/00
[52] U.S. Cl. .................................. 426/231; 426/418; 426/523
[58] Field of Search ............... 426/418, 497, 520, 231, 426/523; 99/467

[56] References Cited

U.S. PATENT DOCUMENTS

| | | | |
|---|---|---|---|
| 3,955,007 | 5/1976 | Roderick | 426/418 |
| 4,062,983 | 12/1977 | Roderick | 426/418 |
| 4,746,526 | 5/1988 | Carroll | 426/497 |

FOREIGN PATENT DOCUMENTS 0145587  6/1985  European Pat. Off. ............ 426/520

OTHER PUBLICATIONS

Food Chemicals Codex, Third Edition, 1981, pp. 331–333.
*Proper Holding Patterns Maintain Food Quality*, Apr. 4, 1990, pp. 125 and 126.

Primary Examiner—George Yeung
Attorney, Agent, or Firm—Scully, Scott, Murphy & Presser

[57] ABSTRACT

A method of extending the holding time for a cooked food under specified conditions of temperature and high relative humidity, and more specifically, a method of significantly extending the holding time for cooked chicken products for an additional period through controlling of the environment or atmosphere within a holding chamber without encountering any appreciable loss in the organoleptic, olfactory or textured qualities of the food. The chicken product is maintained in a holding chamber in an environment or atmosphere at carefully controlled dry bulb and wet bulb temperatures under conditions of a high relative humidity. This high relative humidity in the enviornment within the holding chamber, which is a result of the high partial pressure of water vapor, will prevent any migration or diffusion of water vapor or flavor components from the cooked chicken product to the surroundings, which would cause a degradation in the organoleptic and olfactory properties of the chicken product, and cause the latter to lose its "fresh" taste and attractive appearance to a consumer. The food may also be treated with tocopherol prior to cooking so as to retard and reduce lipid oxidation and development of warmed-over flavor during an extended holding time in the holding chamber subsequent to cooking of the food.

10 Claims, 1 Drawing Sheet

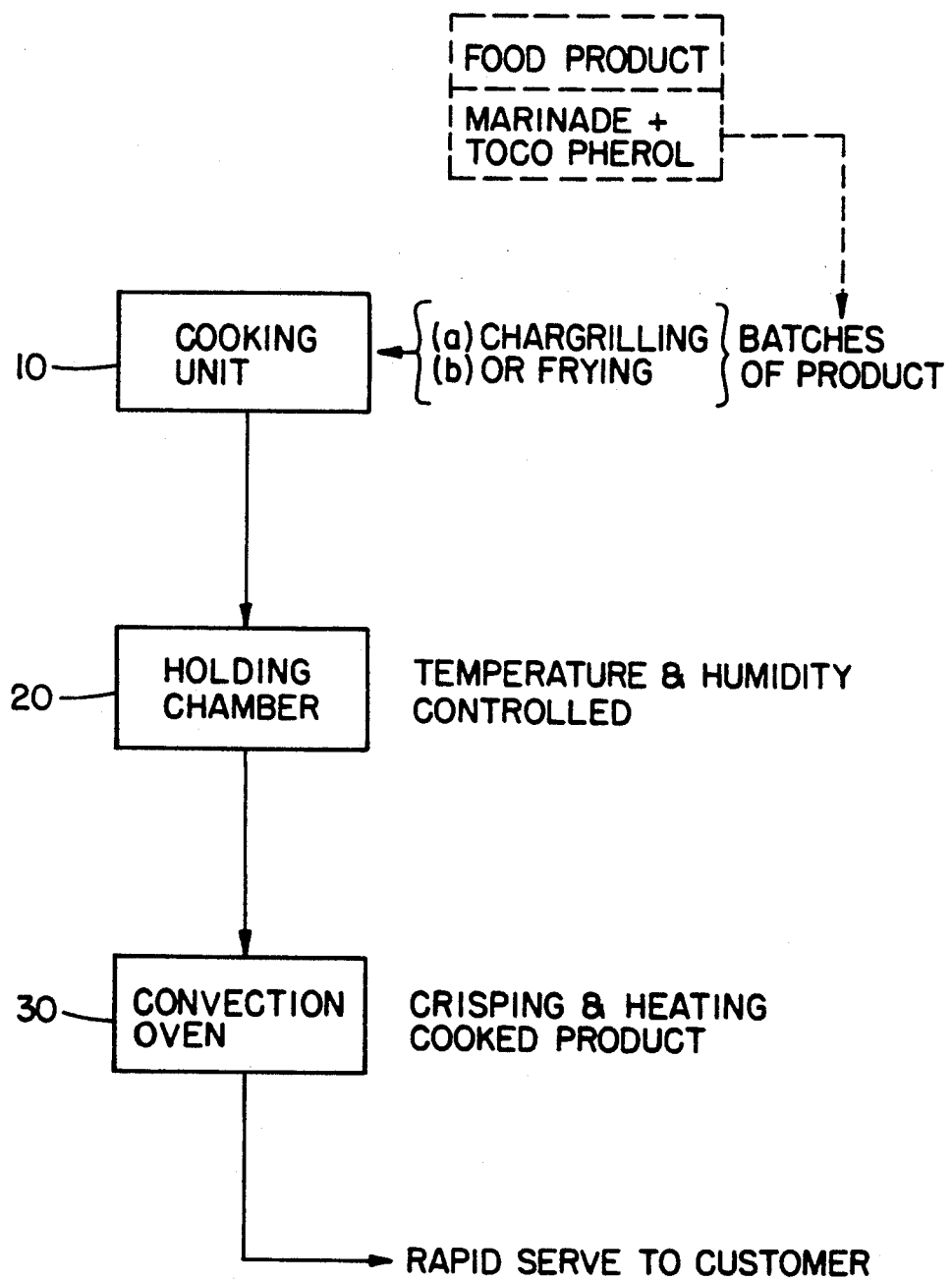

METHOD FOR EXTENDING THE HOLDING TIME FOR COOKED FOOD

BACKGROUND OF THE INVENTION

1. Field of the Invention

The present invention relates to a method of extending the holding time for a cooked food under specified conditions of temperature and high relative humidity, and more specifically, pertains to a novel method of significantly extending the holding time for an additional period through controlling of the environment or atmosphere within a holding chamber without encountering any appreciable loss in the organoleptic, olfactory or textural qualities of the food.

In commercial retail restaurant establishments, especially high volume restaurants of the so-called fast-food or quick service (QSR) type, it is of extreme importance to be able to quickly serve hot foods, which have been prepared some time earlier but which are fresh tasting, to large number of customers within relatively short intervals of time, normally during two major peak periods, such as lunch and dinner hours. Generally, such hot foods, which in the present instance may primarily include chargrilled or broiled or breaded, fried bone-in chicken parts, due to constraints on providing expensive cooking equipment, are ordinarily cooked prior to the two peak serving periods so as to always have sufficient quantities of hot, fresh tasting chicken parts practically immediately available to customers of the restaurant establishments. Hereby, although the foods, such as the chicken parts, are cooked in advance of the peak serving periods, frequently more than an hour beforehand, it is of extreme importance that the flavor, textural, moisture and organoleptic properties thereof be compatible with that of freshly cooked chicken parts in order to fully satisfy the QSR customer's demand for "fresh tasting" food and to enhance so-called repeat business or purchases by the customer at future dates, and also word-of-mouth recommendations to other potential customers, thereby increasing the potential of rendering the restaurant serving the chicken products a viable and commercially successful business establishment.

Hereby, pursuant to the inventive method, the ability to considerably extend the holding time for cooked foods prior to the ultimate serving thereof to a customer, particularly such as chargrilled and fried bone-in chicken parts, which normally degrade in their organoleptic, olfactory and textural properties within relatively short periods of time, enables the preparation well in advance of peak serving periods of large quantities of chicken parts, and the maintenance of the latter under controlled confined environmental or atmospheric conditions while still retaining their initial freshness, in conformance with anticipated customer demands for the chicken product during the peak period, thereby reducing to a minimum the amounts of any so-called "expired" or basically wasted chicken parts due to their degradation in flavor and texture causing them to assume a warmed-over unpalatable taste and thereby becoming essentially unsaleable, or unattractive to customers. By means of the inventive method, it is possible to increase efficiencies in the preparation of such cooked chicken parts and maintain their freshness over extended holding times for possibly 99% of such chicken products, thereby keeping losses due to the degradation thereof to an absolute and economically acceptable minimum.

Moreover, a further advantage of the inventive method resides in the ability of such restaurant establishments to more fully utilize existing cooking equipment at higher capacities in preparing sequential batches of the chargrilled or fried chicken product at earlier and more frequent periods prior to the peak serving periods and then holding the, inasmuch as the extended holding time will enable the earlier prepared cooked batches of chicken parts to retain their full or so-called "fresh" flavor and taste; in essence, giving an impression of having been freshly cooked just before being served to a customer. This will eliminate the necessity for the restaurant having to install and utilize additional cooking equipment to be able to meet anticipated customer demand for such cooked chicken products during the peak serving periods, in effect, lunch and dinner periods.

2. Discussion of the Prior Art

Although methods and apparatus are known in the fast-food restaurant technology with regard to the holding of cooked foods for extended periods of time in conditions of readiness for subsequent reheating and/or consumption by consumers, there is currently no satisfactory system for carefully controlling the environmental temperature and humidity conditions of a holding chamber for cooked chicken products so as to maintain the latter in a generally "fresh" condition and appearance, necessitating only a brief additional heating or crisping treatment of the product for serving to a customer within a short waiting time, while maintaining organoleptic, olfactory, textural and moisture properties at such high levels as to create the impression that the cooked food, such as chargrilled or fried bone-in chicken parts or the like, has just been freshly cooked prior to being served.

Roderick U.S. Pat. No. 4,062,983 discloses a method of maintaining heat and moisture in food, wherein the food, which may be chicken, ribs, hamburgers, hot dogs, hot sandwiches, pies and the like, is maintained in a holding chamber for display to a potential customer, and in which the conditions in the holding chamber are such as to attempt to impart a specified environment tending to maintain the food in a relatively fresh condition over a specific time interval. Although Roderick discloses various temperature ranges in dependence upon specific food products, and also atmospheric moisture ranges in the chamber of up to about 30% relative humidity, there is no disclosure that the holding time is employed in conjunction with an initial cooking step and subsequent reheating in a convection oven to impart crispiness to the outer surface of the cooked and reconstituted food product, such as chicken parts. Furthermore, there is no disclosure of maintaining the temperature within the holding chamber at a minimum level relative to cooked chicken parts of the type considered herein in order to be able to considerably extend the holding times thereof subsequent to initial cooking, in contrast with the relatively limited and short holding times for such product as is known and applied in the current fast-food or QSR technology.

Roderick U.S. Pat. No. 3,955,007 discloses a heat-holding method for the storage of hot foods and the like, in which heated food is maintained in a heating cabinet and relatively dry heat is circulated therethrough. There is no disclosure of utilizing the novel high humidity and relatively low temperature environmental conditions in a holding chamber to maintain cooked foods, such as chargrilled or fried bone-in chicken parts, in a state of "freshness" for extended periods of time, and to be able to reheat and crisp the chicken parts in a convection oven for rapid serving to a consumer while giving the impression that the chicken product has just been freshly prepared and cooked.

In an article entitled "Proper Holding Patterns Maintain Food Quality"; Restaurants and Institutions, April 4, 1990, pages 125 and 126; there is disclosed the utilization of steam tables and bain maries to maintain various types of cooked foods in a properly heated condition for extended periods of time. Hereby, various lengths for holding times and temperature guides are listed for the maintaining of such cooked foods in an essentially edible state, primarily for institutional use and the like. However, based on the temperature ranges which are disclosed, particularly for fried chicken products, due to the relatively high temperature specified at which the fried chicken is maintained in the bain maries or steam tables, at a concomitant loss in crispiness and possible degradation in organoleptic properties imparting a warmed-over taste and texture, which although possibly acceptable for institutional use, would not meet the high levels in quality which are demanded by customers of quick service restaurants and/or fast-food retail outlets.

SUMMARY OF THE INVENTION

Accordingly, it is an object of the present invention to provide a novel and improved method for extending the holding times of cooked foods, particularly such as bone-in chargrilled chicken and breaded fried chicken parts, during periods between their initial cooking and their final crisping in a convection oven immediately before their serving to consumers, and wherein the chargrilled or fried chicken parts will maintain their "fresh" taste and texture notwithstanding being maintained in a holding chamber for an extended holding time.

In this connection, the chicken product is maintained in a holding chamber in an environment or atmosphere by controlling dry bulb and wet bulb temperatures to provide a high relative humidity. This high relative humidity in the environment within the holding chamber, which is a result of the high partial pressure of water vapor, will prevent any migration or diffusion of water vapor or flavor components from the cooked chicken product to the surroundings, which would cause a degradation in the organoleptic and olfactory properties of the chicken product, and cause the latter to lose its "fresh" taste and attractive appearance to a consumer. Hereby, by carefully controlling the above-mentioned atmospheric conditions, it is possible to maintain and store the chicken product over lengthier holding times than heretofore without causing it to lose its special flavor or textural characteristics, such as juiciness and tenderness. Moreover, by maintaining the wet bulb temperature within the holding chamber at close to 150° F., which is generally 20° to 30° F. lower than presently employed temperatures for such holding chambers, this will result in reducing the rates of any biochemical reactions taking place within the product, so as to thereby retard any lipid oxidation and resultant development of a warmed-over flavor for the food. In order to further reduce and retard the rate of oxidation and the development of a warmed-over flavor in the cooked chicken parts during the holding time, pursuant to a further feature of the invention, an antioxidant, such as tocopherol, is added to the product, preferably in an amount not to exceed 0.03% of fat content.

Pursuant to the inventive method, when the chicken product is ordered by a customer; for instance, during a peak serving period, such as during lunch or dinner time, it is merely necessary to remove the required quantity of cooked chicken parts from the controlled-atmosphere holding chamber, and to rapidly heat the chicken product in a high-temperature convection oven so as to crisp the exterior skin or surface while maintaining the interior moisture content thereof. This imparts the chicken parts with an outer skin or breading coating which is crisp whereas the interior remains juicy and fresh-tasting even after much lengthier holding times than presently obtainable in the technology.

Accordingly, it is an object of the present invention to provide a novel method of extending the holding times for cooked food products in contrast with currently attainable holding times in the food technology.

Another more specific object of the invention resides in extending the holding times of a cooked food product, particularly such as bone-in chargrilled or fried chicken parts, in comparison with holding times currently attainable in the prior art, without encountering any appreciable degradation in the quality and appearance and taste in freshness for the chicken parts.

Still another object of the present invention is to provide a method of the type described herein, wherein subsequent to the initial cooking of the chargrilled or fried chicken parts, the latter are maintained in a carefully controlled environment so as to considerably extend their holding time for considerable periods prior to being finally crisped in a convection oven for rapid serving to a consumer, while maintaining the high quality and apparent freshness of the chicken product.

A further object of the invention resides in the provision of a method for extending the holding times for cooked chicken parts and the like, in which the chicken parts are treated with an antioxidant, such as tocopherol, prior to their cooking in order to inhibit or retard lipid oxidation which tends to cause a warmed-over flavor development to take place in the product.

BRIEF DESCRIPTION OF THE DRAWING

Reference may now be had to the detailed description of the inventive method, taken in conjunction with the accompanying single FIGURE of drawing, illustrating a flow diagram of a method of extending the holding time for a hot food, particularly such as chargrilled or fried chicken parts.

DETAILED DESCRIPTION

In this instance, chicken parts, which may be of the bone-in variety commonly sold in large quantities in many quick service or fast-food restaurant establishments; for example, either chargrilled chicken or breaded fried chicken parts are cooked in a standard cooking installation 10, such as a grill or deep fryer, for periods of about 15 to 20 minutes, as is well known in the technology. Prior thereto, the chicken parts may be treated with an antioxidant, such as tocopherol, to further inhibit or retard lipid oxidation and warmed-over flavor development during subsequent holding times, as set forth in more specific detail hereinbelow.

Thereafter, pursuant to the invention, the cooked and normally still hot chicken parts are placed into a closed chamber 20 providing a holding environment, and wherein the environment or atmosphere within the chamber has controlled wet bulb and dry bulb temperature conditions and a high relative humidity imposed thereon in conformance with the type of foods held therein.

Hereby, in the holding chamber 20 the temperature is preferably generally maintained at a minimum level of approximately 150° F., which is considerably lower than holding temperatures normally employed for similar food products which are held in various holding chambers, steam tables and bain maries pursuant to the state-of-the-art, and by carefully controlling and monitoring the atmosphere of both dry bulb and wet bulb temperatures within the chamber, imparts a very high relative humidity to the atmosphere; this resultingly inhibiting any diffusion or migration of water vapor or flavor constituents to the surroundings from the chicken parts being held. Consequently, by causing the chicken parts to maintain their moisture and flavor constituents, the chicken parts may be held for lengthier periods of time in the holding chamber without losing their special flavor or organoleptic and textural characteristics, such as juiciness and tenderness, thereby retaining the olfactory and organoleptic properties so as to impart a "fresh" taste and appearance to the chicken product which would be highly pleasing to a customer.

Moreover, maintaining the wet bulb temperature at a low level close to 150° F., results in reducing the rates of any biochemical reactions within the chicken product, thereby retarding any lipid oxidation and development of warmed-over flavor which would render the product unattractive and unappealing in taste to a customer, and thereby resulting in larger amounts in waste of such product, reducing profitability to the restaurant establishment and generating customer dissatisfaction.

An optimization in extending the holding times for the cooked chicken parts may be attained by treating the chicken parts prior to their initial cooking with an antioxidant, such as tocopherol. In this instance, a preferred method of imparting the tocopherol to the uncooked chargrilled chicken parts is to include the tocopherol as a constituent of an edible vegetable oil which is added to a marinade in which the chicken parts are marinated before cooking. For fried bone-in chicken, the tocopherol may be added to the spice/breading mix. The tocopherol, which is preferably of the low-alpha type considered to be primarily an antioxidant retarding or reducing the rate of lipid oxidation and warmed-over flavor development, is added to the product in an amount not to exceed 0.03% of fat content.

When it is desired to serve the chicken parts to customers during peak serving periods, such as during lunch or dinner, it is merely necessary to remove the required quantities of the chicken parts from the controlled-atmosphere holding chamber, and to rapidly heat and dry the chicken product in a high-temperature convection oven 30 so as to crisp the exterior skin or breading-coated surface thereof. This provides the chicken parts with an outer skin which is crisp in texture, whereas the interior of the chicken parts remain juicy and moist while retaining a "fresh" taste, even after extending the holding times currently known in the art by as much as over four times in duration.

Thus, presently employed holding systems in which the dry bulb holding temperature is about 185° F., only allow the holding periods for bone-in chicken products to be approximately 60 to 90 minutes, depending on the type of chicken product, i.e. chargrilled or fried, whereby the holding time to cooking time ratio may be as low as 2:1 or as high as 6:1 before encountering noticeable degradations in taste and quality. Consequently, pursuant to the invention, in order to increase the efficiencies, in effect, eliminating waste or "expired" chicken products, through initially treating the uncooked chicken products with an antioxidant, such as tocopherol, to reduce and retard lipid oxidation, and after cooking by reducing the temperature in the holding chamber while maintaining a high relative humidity, the chargrilled chicken product may have the ratio between the hold time to cook time increased up to 12:1 from the present 3:1, and for the fried chicken parts increased to a ratio of up to 18:1 from 6:1, thereby permitting holding times of up to three to four hours for chargrilled chicken parts and up to six hours for fried chicken parts without any appreciable degradation in the organoleptic, olfactory and textural properties of the chicken parts. The lower temperature employed also permits the chicken parts to be maintained at a microbiologically safe level, and consequently, when the cooked chicken parts are held at the lower temperature, it may be readily expected that any undesirable possibly encountered sensory degradations, such as warmed-over flavor, denaturation of the protein complex and many other subordinate reactions normally expected in such cooked chicken products will be retarded. Thus, basically maintaining the chicken product at high water vapor pressure serves a dual purpose; namely (a) to maintain the interior meat texture moist and juicy, and (b) to prevent any flavor components' diffusing to the environment or surroundings because of the positive pressure gradient from the outside to the inside of the chicken product which is present in the holding chamber. Moreover, the maintenance of the lower temperature in the holding chamber 20 retards the quality degradation of most chemical reactions and non-enzyme browning of the product.

From the foregoing, it thus becomes readily apparent that the inventive method provides for an extended holding time for cooked products, particularly such as, chargrilled and fried chicken parts, thereby enabling a more efficient and economic operation in their preparation prior to peak serving periods in quick service restaurant establishments, and so as to thereby reduce any waste and spoilage of product to a minimum level, while maintaining the high quality in the flavor and texture of the chicken product.

While there has been shown and described what is considered to be a preferred embodiment of the invention, it will of course be understood that various modifications and changes in form or detail could readily be made without departing from the spirit of the invention. It is therefore intended that the invention not be limited to the exact form and detail herein shown and described, nor to anything less than the whole of the invention herein disclosed as hereinafter claimed.

What is claimed is:

1. A method of extending the holding time for a cooked food comprising a chargrilled or fried chicken product under specified atmospheric temperature and humidity conditions in the absence of encountering any appreciable degradation in the organoleptic properties and losses of moisture content in the food; comprising confining said food in a closed chamber; maintaining an atmospheric environment of a relative humidity within the range of about 70 to 95% under controlled dry bulb and wet bulb temperature conditions within said chamber so as to reduce any dissipation of moisture from said food to the environment to a negligible level; and concurrently regulating the temperature in said chamber to a minimum level to control and maintain said relative humidity in said chamber to inhibit diffusion of water vapor and flavor constituents from said food to the environment normally tending to degrade the organoleptic and textural properties thereof, the cooking time for said chicken product being about 15 to 20 minutes, and the holding time being in a ratio from about 12:1 to 18:1 relative to the cooking time without encountering any significant degradation in the organoleptic properties, texture and moisture content of said chicken product.

2. A method as claimed in claim 1, comprising maintaining the wet bulb temperature in said chamber at about 150° F.

3. A method as claimed in claim 1, wherein said ratio between the cooking time and holding time is up to about 12:1 for chargrilled, bone-in chicken parts.

4. A method as claimed in claim 1, wherein said ratio between the cooking time and holding time is up to about 18:1 for breaded fried bone-in chicken parts.

5. A method as claimed in claim 1, wherein said cooked chicken product is subjected to a heat source for rapidly drying the surface thereof subsequent to removal form said chamber so as to impart a crispy texture to the surface of said chicken product.

6. A method as claimed in claim 5, wherein said heat source comprises a high-temperature convection oven.

7. A method as claimed in claim 1, wherein prior to initially cooking said food, said uncooked food is treated with an antioxidant to reduce and retard lipid oxidation of said food subsequent to cooking thereof.

8. A method as claimed in claim 7, wherein said antioxidant consists of tocopherol.

9. A method as claimed in claim 8, wherein said tocopherol is essentially a low-alpha type tocopherol.

10. A method as claimed in claim 8, wherein said food consists of chicken parts, said tocopherol being added to a marinade or to a spice and breading mix for said chicken parts prior to the cooking thereof.

* * * * *

UNITED STATES PATENT AND TRADEMARK OFFICE
CERTIFICATE OF CORRECTION

PATENT NO. : 5,077,065
DATED : December 31, 1991
INVENTOR(S) : Dennis Ash, et al.

It is certified that error appears in the above-identified patent and that said Letters Patent is hereby corrected as shown below:

```
        Column 2, line 9:   "holding the"  should read
--holding them--
        Column 8, line 7, Claim 5:   "form"  should read
--from--
```

Signed and Sealed this

First Day of June, 1993

Attest:

MICHAEL K. KIRK

*Attesting Officer*     Acting Commissioner of Patents and Trademarks